US008619534B2

(12) United States Patent
Knappmann et al.

(10) Patent No.: US 8,619,534 B2
(45) Date of Patent: Dec. 31, 2013

(54) APPARATUS FOR READING FROM AND/OR WRITING TO A NEAR-FIELD OPTICAL RECORDING MEDIUM

(75) Inventors: Stephan Knappmann, Rottweil (DE); Frank Przygodda, Friedrichshafen (DE)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/518,076

(22) PCT Filed: Dec. 7, 2010

(86) PCT No.: PCT/EP2010/069095
§ 371 (c)(1),
(2), (4) Date: Sep. 4, 2012

(87) PCT Pub. No.: WO2011/076562
PCT Pub. Date: Jun. 30, 2011

(65) Prior Publication Data
US 2013/0003515 A1    Jan. 3, 2013

(30) Foreign Application Priority Data

Dec. 22, 2009  (EP) .................................... 09306309
Feb. 23, 2010  (EP) .................................... 10305174

(51) Int. Cl.
*G11B 7/00*    (2006.01)
(52) U.S. Cl.
USPC .................................. 369/112.03; 369/13.33
(58) Field of Classification Search
USPC ........ 369/13.33, 44.11, 44.32, 53.19, 112.03, 369/112.05, 112.07
See application file for complete search history.

(56) References Cited

U.S. PATENT DOCUMENTS 8,036,094 B2 * 10/2011 Knittel ..................... 369/112.23
2011/0007613 A1    1/2011 Ito et al.
2011/0141864 A1 *  6/2011 Lin et al. .................... 369/44.14

FOREIGN PATENT DOCUMENTS

WO   WO 2005/104109    11/2005
WO   WO 2009/116229     9/2009

OTHER PUBLICATIONS

Katayama et al: "Substrate thickness error and radial tilt detection using a five-beam optical head" Applied Optics, vol. 48, No. 11, Apr. 10, 2009, pp. 2014-2026.
Search Report Dated Mar. 3, 2011.

* cited by examiner

*Primary Examiner* — Wayne Young
*Assistant Examiner* — Brenda Bernardi
(74) *Attorney, Agent, or Firm* — Robert D. Shedd; Richard LaPeruta

(57) ABSTRACT

An apparatus for reading from or writing to a near-field optical recording medium capable of detecting tilt and spherical aberration is described. The apparatus comprises a light source for generating a reading light beam, a near-field lens, an aberration compensation element, and a diffractive optical element. The diffractive optical element is switchable between a far-field mode and a near-field mode and is adapted to generate a main light beam and four or more sub-beams from the reading light beam for determining at least a cover layer thickness error signal. For this purpose it has an outer region with a first grating period and an inner region having a diameter smaller than an effective numerical aperture of the near-field lens, which in the near-field mode has a second grating period and which has a switchable inner area having a diameter smaller than a far-field numerical aperture of the near-field lens, which in the far-field mode has the first grating period. The aberration compensation element is adapted to be adjusted based on the thickness error signal when the diffractive optical element is in the near-field mode.

11 Claims, 8 Drawing Sheets

APPARATUS FOR READING FROM AND/OR WRITING TO A NEAR-FIELD OPTICAL RECORDING MEDIUM

This application claims the benefit, under 35 U.S.C. §365 of International Application PCT/EP2010/069095, filed Dec. 7, 2010, which was published in accordance with PCT Article 21(2) on Jun. 30, 2011 in English and which claims the benefit of European patent application No. 09306309.7, filed Dec. 22, 2009 and European patent application No. 10305174.4, filed Feb. 23, 2010.

FIELD OF THE INVENTION

The present invention relates to an apparatus for reading from and/or writing to a near-field optical recording medium. More specifically, the invention relates to an apparatus for reading from and/or writing to a near-field optical recording medium capable of detecting tilt and spherical aberration. The invention further relates to a method for operating the apparatus.

BACKGROUND OF THE INVENTION

Optical data storage is generally limited by the optical resolution of the read/write-system. Straightforward methods of increasing the optical resolution include using a shorter wavelength and a larger numerical aperture NA, at the costs of lens complexity. Further approaches are narrowing the allowable tilt margins for the optical storage media or reducing the wavelength of the scanning laser into the blue or near-UV range. A different approach for reducing the focus spot size in an optical data storage system is using near-field optics with a high numerical aperture (NA>1). This high numerical aperture is generally achieved by help of a solid immersion lens (SIL). While conventional systems like CD, DVD or BD operate in the optical far-field regime, which is described by classical optics, the aforementioned new systems work in the optical near-field regime, which is described by near-field optics. For conventional systems the working distance, i.e. the air gap between the surface of the optical storage medium and the first optical surface of the read/write-head, usually the objective lens, is in the scale of 100 µm. In contrast, systems making use of near-field optics need a very small working distance or air gap, which is in the scale of 50 nm or less. The small air gap is necessary to ensure that evanescent waves may couple into optical storage medium.

Usually the cover layer thickness of a near-field optical recording medium is not perfectly homogeneous due to the limitations of the spin coating process. Especially from the inner radius to the outer radius the thickness deviation is higher than at constant radius. Therefore, the thickness deviation has to be compensated by adjusting an optical element, e.g. a telescope or liquid crystal element. To this end WO 2005/104109 discloses a near-field optical data storage system using an objective including a solid immersion lens. The system includes means for adjusting an optical element in order to compensate for variations of the thickness of the cover layer of the near-field optical recording medium.

It is especially required to re-adjust the optics if the pickup jumps from the inner area of the near-field optical recording medium to another area at a higher radius or vice versa. To enable this re-adjustment it is advantageous to detect spherical aberration introduced by changes of the substrate thickness and radial tilt. An advanced pickup with five beams, which is capable of detecting spherical aberration introduced by changes of the substrate thickness and radial tilt, has recently been proposed in R. Katayama et al.: "*Substrate thickness error and radial tilt detection using a five-beam optical head*", Appl. Opt. Vol. 48 (2009), pp. 2014-2026.

SUMMARY OF THE INVENTION

It is an object of the invention to propose an apparatus for reading from and/or writing to a near-field optical recording medium capable of detecting at least tilt and spherical aberration.

According to the invention, an apparatus for reading from and/or writing to a near-field optical recording medium has a light source for generating a reading light beam, a near-field lens, an aberration compensation element, and a diffractive optical element. The diffractive optical element is switchable between a far-field mode and a near-field mode and is adapted to generate a main light beam and four or more sub-beams from the reading light beam for determining one or more error signals. The diffractive optical element makes it possible to switch the apparatus between two modes, namely the near-field mode and the far-field mode. For this purpose, the diffractive optical element has an outer region with a first grating period and an inner region having a diameter smaller than an effective numerical aperture of the near-field lens, which in the near-field mode has a second grating period. The inner region has a switchable part having a diameter smaller than a far-field numerical aperture of the near-field lens, which in the far-field mode has the first grating period. The switchable part preferably includes a liquid crystal grating structure sandwiched between transparent electrodes. The near-field mode is used for data recording or readout. The far-field mode is used for radial movement. In both modes the diffractive optical element generates a main beam and four sub-beams, which are detected by a first photodetector with five four-element detectors. Advantageously, the apparatus further has a second photodetector with at least three detectors. With these two photodetectors a data signal (HF) and at least a cover layer thickness error signal (SE) are determined. The aberration compensation element is adapted to be adjusted based on the thickness error signal when the diffractive optical element is in the near-field mode. With the two photodetectors a plurality of additional error signals can be generated with reasonable complexity, namely a focusing error signal (FE), a tracking error signal (PP), a radial tilt error signal (RTE), a gap error signal (GES), and a tangential tilt error signal (TTE).

Deviations of the cover layer thickness of an optical recording medium are detected in the far-field mode by detecting a cover layer thickness error signal using signals obtained from the main light beam and/or the sub beams before the apparatus goes into the near-field mode. Then the optics are adjusted, e.g. an aberration compensation element, which is adapted to compensate coma and/or spherical aberrations in response to one or more of the determined error signals. Subsequent to the adjustment the apparatus goes into the near-field mode. This has the advantage that contrary to known systems, where the optics are adjusted in the near-field mode, the focus system remains stable and the risk of contact between the near-field lens and the optical recording medium is reduced. Also, the tangential tilt detection is more sensitive than it is the case for known solutions based on the four quadrants used for detecting a gap error signal.

According to a further aspect of the invention, a method for operating an apparatus for reading from a near-field optical recording medium has the steps of:

operating a diffractive optical element of the apparatus in far-field mode by setting a grating pattern of an inner area of the diffractive optical element having a diameter smaller than a far-field numerical aperture of a near-field lens of the apparatus to a first grating pitch while setting a grating pattern of a ring area surrounding the inner area to a second grating pitch smaller than the first grating pitch;

operating the near-field lens in far-field mode by adding a focus offset to the near-field lens;

determining a cover layer thickness error signal from signals obtained from a main light beam and four or more sub-beams generated by the diffractive optical element;

switching the diffractive optical element into near-field mode by setting a grating pattern of an inner region of the diffractive optical element having a diameter smaller than an effective numerical aperture of the near-field lens to the second grating pitch while setting a grating pattern of an outer region surrounding the inner region to the first grating pitch;

switching the near-field lens into near-field mode; and using the thickness error signal to adjust an aberration compensation element once the diffractive optical element and the near-field lens have switched into the near-field mode.

The invention proposes to detect deviations of the cover layer thickness already before the apparatus goes into the near-field mode. Only after the optics are adjusted the apparatus goes into the near-field mode. This has the advantage that the focus system remains stable and the risk of contact between the near-field lens and the optical recording medium is reduced. Of course, it is likewise possible to first switch the near-field lens into near-field mode before switching the diffractive optical element into near-field mode, or to perform both switching operations simultaneously.

Preferably, during a jump the cover layer thickness between a start data zone and a target data zone is quickly scanned. This allows to obtain information about deviations of the cover layer thickness of the optical recording medium even before accessing specific areas of the optical recording medium.

Favorably, the apparatus checks if the cover layer thickness in the target data zone is in spec before switching into the near-field mode. If this is not the case, the apparatus preferably rejects to access the optical recording medium or at least certain areas of a the optical recording medium.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

Figure 1:
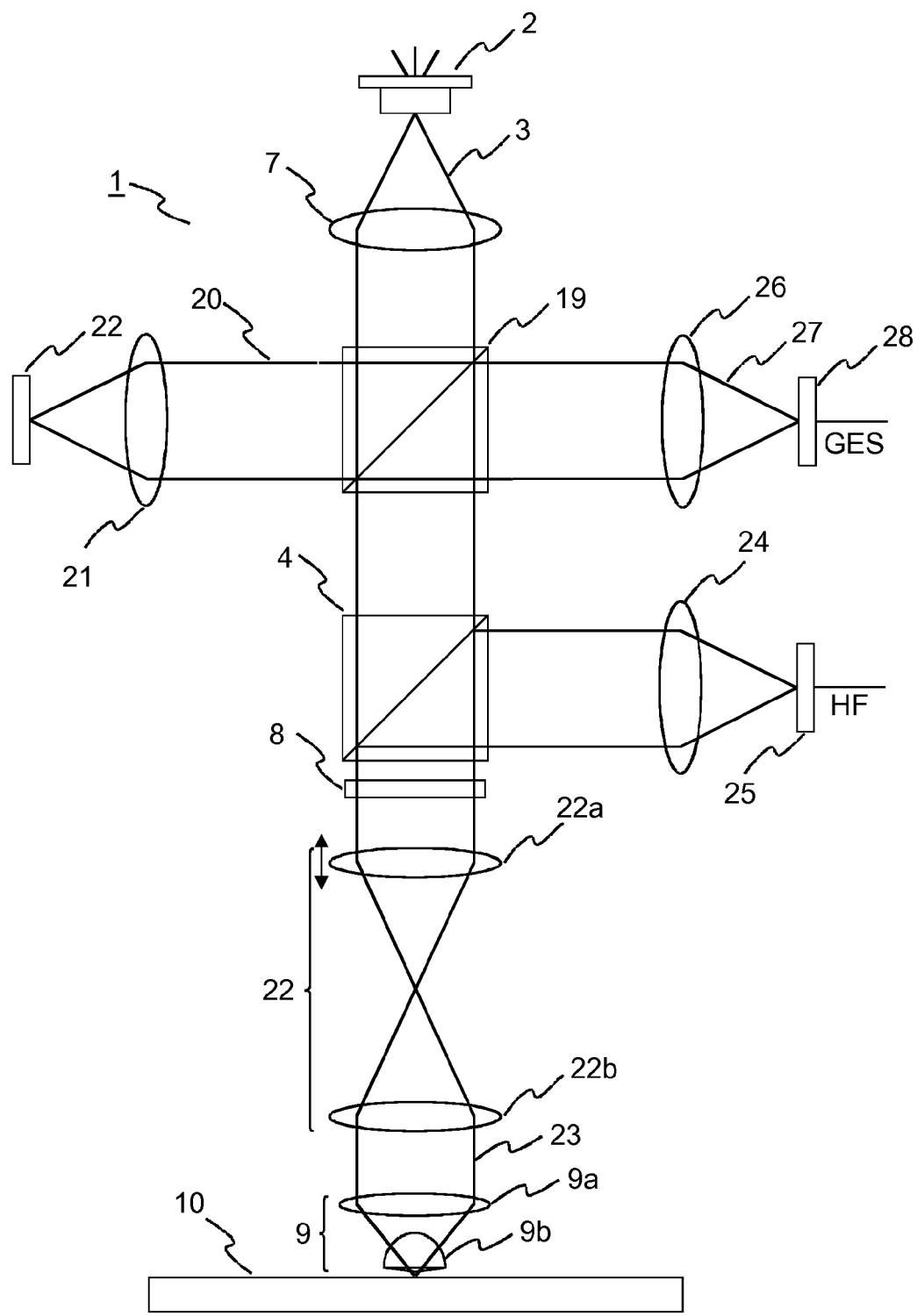
FIG. 1 depicts a known apparatus for reading from a near-field optical recording medium.

An exemplary apparatus 1 for reading from a near-field optical recording medium is illustrated in FIG. 1. This apparatus is known from C. A. Verschuren et al.: "*Near-Field Recording with a Solid Immersion Lens on Polymer Coverlayer Protected Discs*", Jap. J. Appl. Phys., Vol. 45 (2006), pp. 1325-1331. A reading light beam 3 emitted by a laser diode 2 is collimated by a collimating lens 7. A non-polarizing beam splitter 19 directs a small fraction 20 of the reading light beam 3 via a first objective lens 21 onto a forward detector 22 for measuring the output power of the laser diode 2. The main part of the reading light beam 3 passes a polarizing beam splitter 4 and a quarter wave plate 8, which converts the polarization of the reading light beam 3 into a circular polarization. The reading light beam 3 then passes through a telescope 22 for focus adjustment, which consists of two lenses 22a, 22b. A near-field lens 9 consisting of a second objective lens 9a and a solid immersion lens 9b finally directs the reading light beam 3 onto the surface of an optical recording medium 10. After interaction with the optical recording medium 10 the returning reading light beam 23 passes the quarter wave plate 8, which converts the polarization of the returning reading light beam 23 into a linear polarization. Therefore, most of the returning reading light beam 23 is diverted by the polarizing beam splitter 4 into a detection branch. In the detection branch the returning reading light beam 23 is directed by a third objective lens 24 onto a photodetector 25 for generating a data signal HF. A small fraction 27 of the returning reading light beam 23 passes through the polarizing beam splitter 4, as the total reflection causes a slight rotation of the direction of polarization, and is directed by the non-polarizing beam splitter 19 and a fourth objective lens 26 onto a photodetector 28 for generating a gap error signal GES. For generating the gap error signal use is made of the fact that the amount of reflected light due to total internal reflection in the solid immersion lens 9b is proportional to the size of the air gap at least in the size range used for near-field storage. Further details on optical storage systems making use of near-field optics and the gap error signal are disclosed in F. Zijp et al.: "*High-Density Near-Field Optical Recording With a Solid Immersion Lens, Conventional Actuator, and a Robust Air Gap Servo*", IEEE Trans. Mag., Vol. 41 (2005), pp. 1042-1046.

Figure 2:
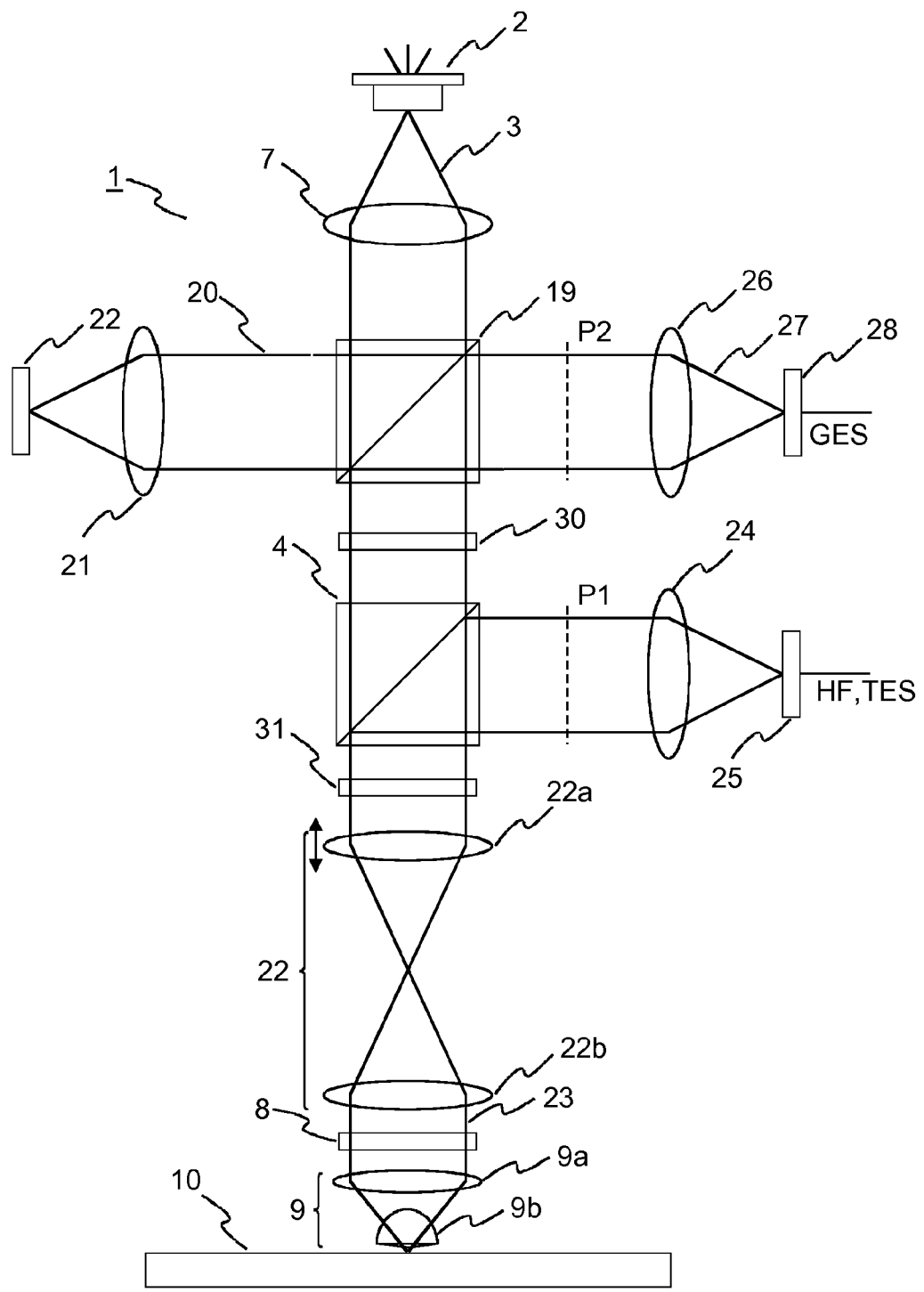
FIG. 2 illustrates an apparatus according to the invention for reading from a near-field optical recording medium.

FIG. 2 shows the basic concept of an apparatus 1 according to the present invention. In the figure the apparatus 1 is working in a conventional mode. For better clarity only the main beam is shown. The design is largely identical to the optical design described with reference to FIG. 1. However, some modifications are made to enable the detection of spherical aberration and tilt. First the light beam 3 emitted from the laser diode 2 (e.g. at a wavelength of 405 nm) is collimated by the collimating lens 7 and passes the non polarizing beam splitter 19, which preferably has a transmission of 50%. The reflected light 20 is advantageously used for monitoring the laser power using the forward detector 22. Then, the light passes a diffractive optical element 30 and the polarizing beam splitter 4 with nearly 100% transmission. The diffractive optical element 30 is similar to a diffractive optical element described in R. Katayama et al.: "*Substrate thickness error and radial tilt detection using a five-beam optical head*", Appl. Opt. Vol. 48 (2009), pp. 2014-2026, but is modified to allow the operation in near-field mode and far-field mode. As will be explained later, a switching mechanism is provided for an inner area of the diffractive optical element 30 in order to switch between the two modes. Downstream of the polarizing beam splitter 4 an aberration compensation element 31 is placed, which allows to compensate coma and spherical aberrations using error signals detected by the different detectors, as will be described below. Then the light beam passes through the telescope 22 and the quarter wave plate 8 and is focused onto a data layer of the optical recording medium 10 by the near-field lens 9. After reflection the polarization of the signal beam 23 is rotated by 90° due to the quarter wave plate 8. Therefore, this light is reflected by the polarizing beam splitter 4 and focused on the photodetector 25 for generating the data signal HF and a tracking error signal TES. Depending on the actual distance between the surface of the optical recording medium 10 and the solid immersion lens 9b a part of the light is reflected at the inner side of the solid immersion lens 9b by total internal reflection. This light is transmitted through the polarizing beam splitter 4 and reflected by the non polarizing beam splitter 19 towards the photodetector 28, which allows generating the gap error signal GES.

Figure 3:
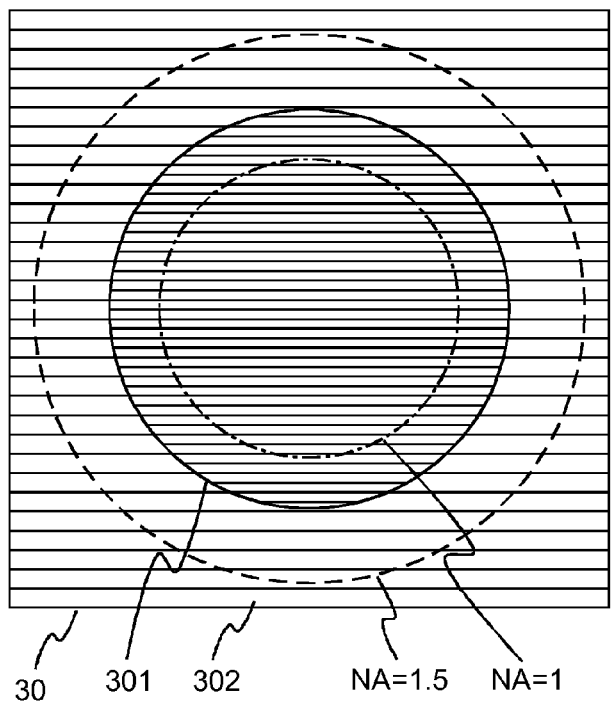
FIG. 3 shows a top view of a diffractive optical element of the apparatus of FIG. 2 working in near-field mode.

FIG. 3 shows a top view of the diffractive optical element 30 working in a near-field mode. The diffractive optical element 30 has surface relief grating patterns that are different for an inner circular region 301 and an outer region 302. The diameter of the inner circular region 301, whose corresponding NA is, for example, about 1.23, is smaller than the effective diameter of the near-field lens 9, whose corresponding NA is 1.5. The grating pitch P of the inner region 301 is half of the grating pitch 2P of the outer region 302. The grating patterns in the inner region 301 and in the outer region 302 generate a 0th-order light beam and ±1st-order diffracted light beams. The transmission efficiency is about 80% for the 0th-order light beam, whereas the diffraction efficiencies for the ±1st-order diffracted light beams are about 8% each, in both the inner region 301 and the outer region 302.

Figure 4:
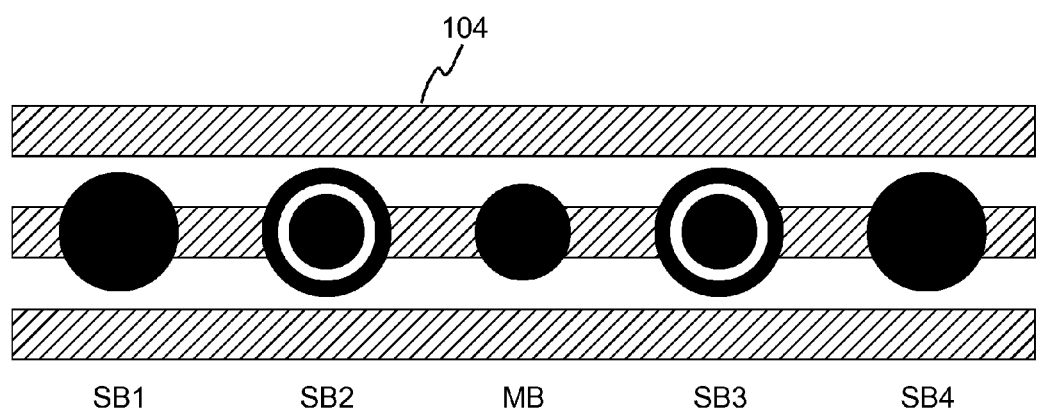
FIG. 4 depicts five light spots formed on the near-field optical recording medium in near-field mode.

As a consequence five different focused spots are formed on the optical recording medium 10 as shown in FIG. 4. The main beam MB corresponds to the 0th-order light beam from the inner region 301 and the outer region 302 of the diffractive optical element 30. The first sub-beam SB1 and the fourth sub-beam SB4 correspond to the +1st-order diffracted light beam and the −1st-order diffracted light beam from the inner region 301 of the diffractive optical element 30, respectively. The second sub-beam SB2 and the third sub-beam SB3 correspond to the +1st-order diffracted light beam and the −1st-order diffracted light beam from the outer region 302 of the diffractive optical element 30, respectively. The five focused spots are placed on the same track. The tracks 104 are schematically indicated by the hashed rectangular areas. On the one hand, the focused spot diameter of the first and fourth sub-beams SB1, SB4 is larger than the focused spot diameter of the main beam MB. On the other hand, the focused spot diameter of the second and third sub-beams SB2, SB3 is smaller than the focused spot diameter of the main beam MB, while the intensity of the side lobe is higher. In the literature it can be found that the typical field of view of an objective lens with NA=1.45 is in the range of ±0.24° (see, for example, C. A. Verschuren et al.: "*Towards Cover-Layer Incident Read-Out of a Dual-layer Disc with a NA=1.5 Solid Immersion Lens*", Jpn. J. Appl. Phys. Vol. 44 (2005), pp. 3554-3558). This corresponds to a distance of ±2 μm if the diameter of the solid immersion lens 9b is 1 mm. Therefore, under these conditions the five spots should be arranged at a maximum distance of 1 μm. The minimum displacement is given by the overlap of the spots and is estimated to be around 500 nm.

Figure 5:
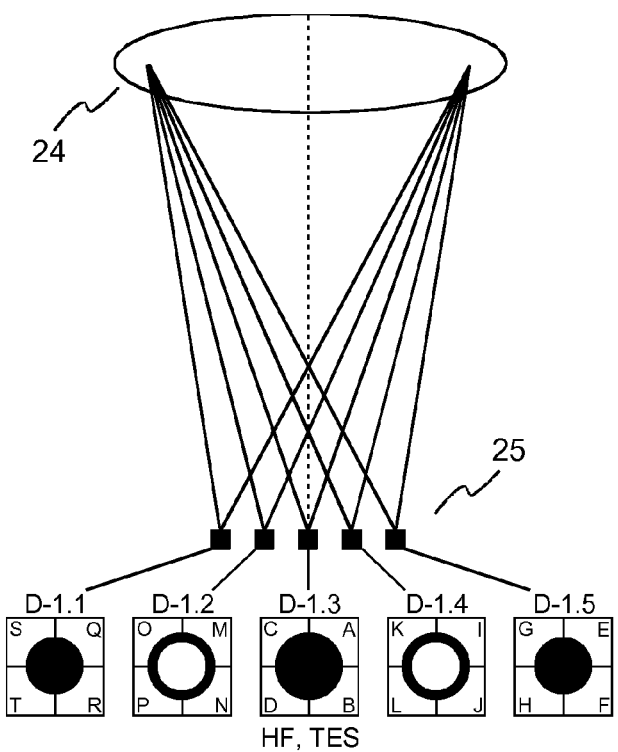
FIG. 5 illustrates a photodetector pattern and beam spot configuration on the photodetector for the data signal path.

FIG. 5 shows a detector pattern and the beam spot configuration on the photodetector 25 for the data signal path. Each of the five beams SB1, SB2, MB, SB3, SB4 is detected by a corresponding four-element detectors D-1.1, D-1.2, D-1.3, D-1.4, D-1.5. When output signals from the detector elements A to T are represented as A to T, respectively, astigmatic signals for the main beam MB ($AS_m$) and the four sub-beams SB1, SB2, SB3, SB4 ($AS_{s1}$ to $AS_{s4}$) are obtained as follows:

$$AS_m = (A+D)-(B+C) \quad (1)$$

$$AS_{s1} = (E+H)-(F+G) \quad (2)$$

$$AS_{s2} = (I+L)-(J+K) \quad (3)$$

$$AS_{s3} = (M+P)-(N+O) \quad (4)$$

$$AS_{s4} = (Q+T)-(R+S) \quad (5)$$

Push-pull signals for the main beam MB ($PP_m$) and the four sub-beams SB1, SB2, SB3, SB4 ($PP_{s1}$ to $PP_{s4}$) are obtained as follows:

$$PP_m = (A+B)-(C+D) \quad (6)$$

$$PP_{s1} = (E+F)-(G+H) \quad (7)$$

$$PP_{s2} = (I+J)-(K+L) \quad (8)$$

$$PP_{s3} = (M+N)-(O+P) \quad (9)$$

$$PP_{s4} = (Q+R)-(S+T) \quad (10)$$

The astigmatic signal $AS_m$ is used as a focusing error signal FE in accordance with the astigmatic method, and the push-pull signal $PP_m$ is used as a tracking error signal TES in accordance with the push-pull method.

A radial tilt signal RTE is obtained as follows:

$$RTE = (PP_{s1}+PP_{s4})-(PP_{s2}+PP_{s3}) \quad (11)$$

More details on the principle of radial tilt detection can be found, for example, in R. Katayama et al.: "*Substrate thickness error and radial tilt detection using a five-beam optical head*", Appl. Opt. Vol. 48 (2009), pp. 2014-2026.

A readout signal HF is obtained from the detector elements A+B+C+D. A high signal-to-noise ratio is obtained for the readout signal HF because the photodetector 25 does not have any additional detecting sections for the main beam MB to detect the substrate thickness error or the radial tilt.

Figure 6:
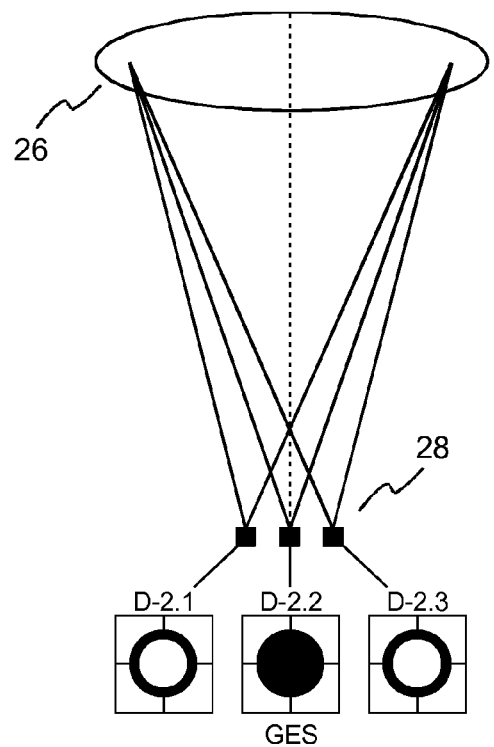
FIG. 6 depicts a photodetector pattern and beam spot configuration on the photodetector for the gap error signal path.
Figure 7:
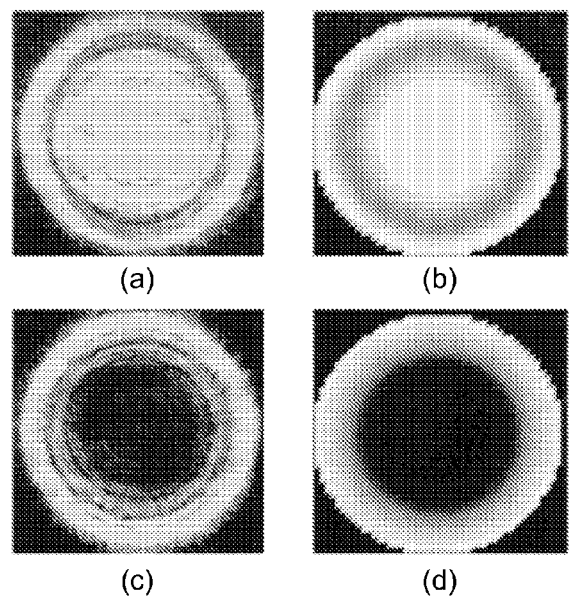
FIG. 7 depicts observed and calculated light distributions in two planes of FIG. 2.

As described with reference to FIG. 2, a part of the light in the backwards path is reflected by the non-polarizing beam splitter 19 toward the photodetector 28, which has three detectors D-2.1, D-2.2 and D-2.3. The detector pattern and the beam spot configuration on this photodetector 28 is depicted in FIG. 6. The main beam MB is focused on the detector D-2.2 and is used for generating the gap error signal GES. In contrast to the five beams that reach the detector areas D-1.1 to D1.5 of the photodetector 25, the first and fourth sub-beams SB1, SB4, which are generated by the grating structure in the inner region 301 of the diffractive optical element 30, can be neglected. This is confirmed in FIG. 7, which shows the observed and the calculated light distributions in plane P1 of FIG. 2 (data signal light path; FIGS. 7(a) and (b)) and in plane P2 of FIG. 2 (gap error signal light path; FIGS. 7(c) and (d)). It can clearly be seen in pictures (c) and (d) that there is no contribution to the gap error signal GES from the inner region 301 of the diffractive optical element 30. Therefore, only the second and third sub-beams SB2, SB3 are shown in FIG. 6. FIG. 7 is taken from K. Saito et al.: "*Readout Method for Read Only Memory Signal and Air Gap Control Signal in a Near Field Optical Disc System*", Jpn. J. Appl. Phys. Vol. 41 (2002), pp. 1898-1902. All three detectors D-2.1, D-2.2 and D-2.3 generate a gap error signal GES. However, the amplitude on the outer detectors D-2.1 and D-2.3 strongly depends on the tangential tilt of the optical recording medium 10. Therefore, a tangential tilt signal TTE is obtained as follows:

$$TTE = \text{Sum}(D\text{-}2.1) - \text{Sum}(D\text{-}2.3) \quad (12)$$

This method has a much higher sensitivity and a much higher signal-to-noise ratio compared to a method using the four quadrants of the main beam MB, as the sub-beams are distanced when they pass the air gap between the solid immersion lens 9b and the surface of the optical recording medium 10.

Figure 8:
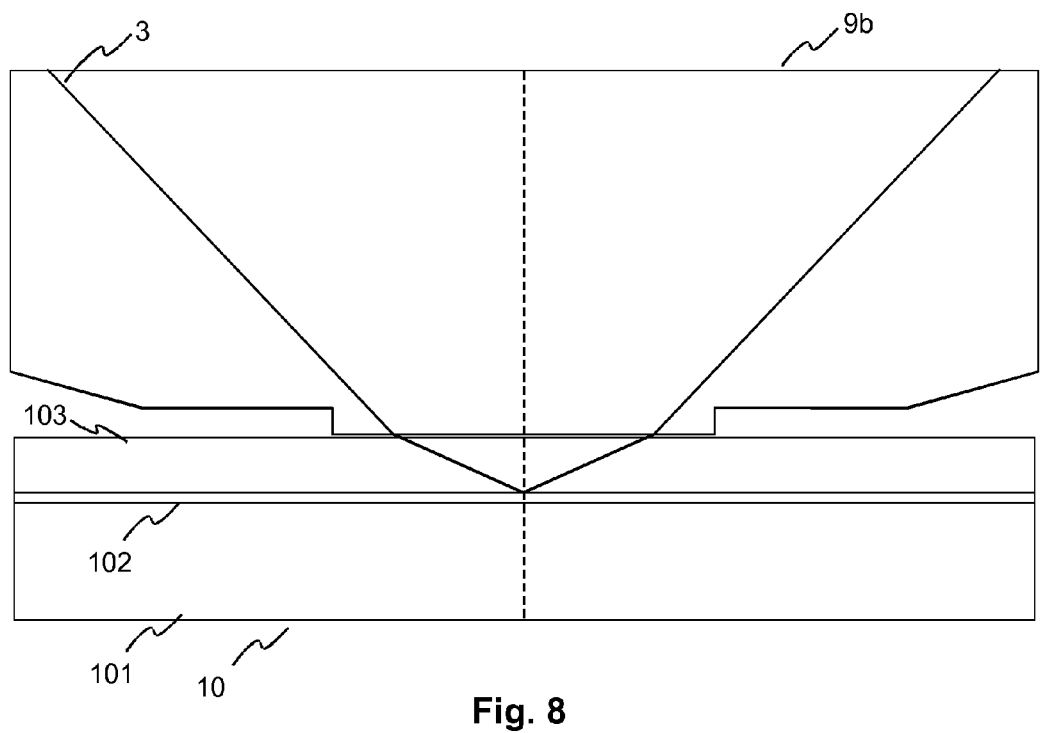
FIG. 8 illustrates a solid immersion lens operating in far-field mode.
Figure 9:
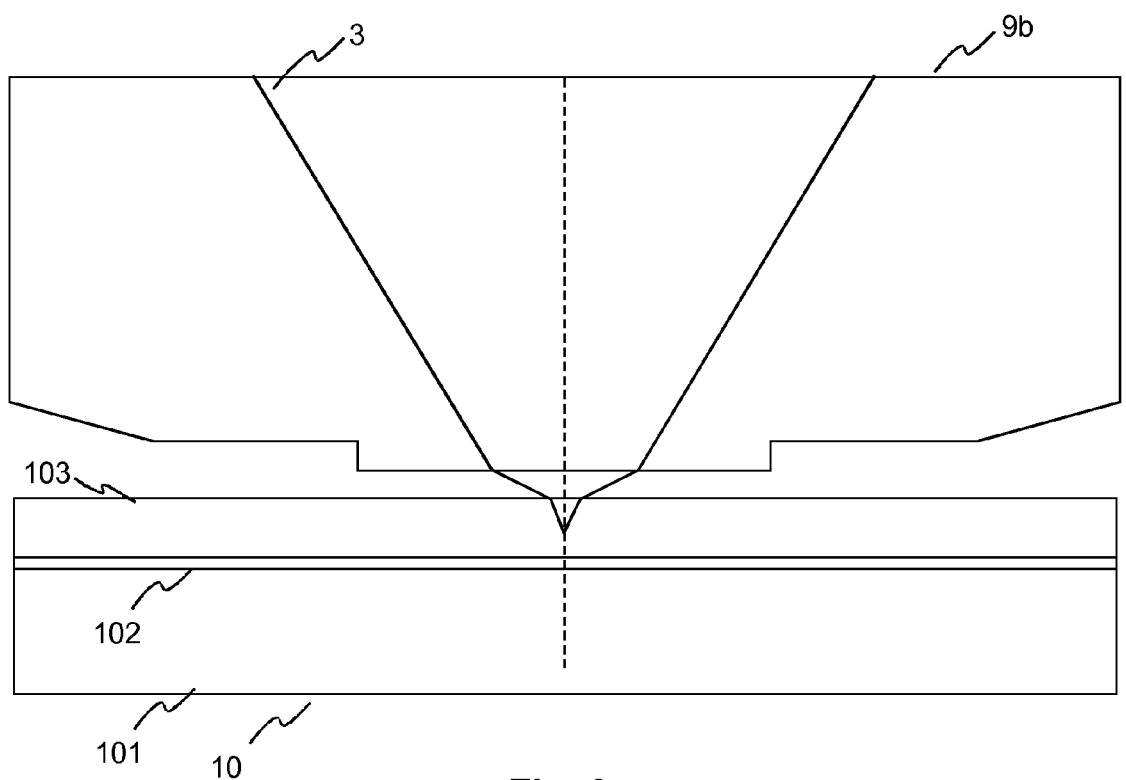
FIG. 9 shows the solid immersion lens of FIG. 8 operating in near-field mode.

In the far-field mode the conventional astigmatic focus error signal is used to adjust the focus position of the optical pickup. This is required to enable the detection of a thickness error signal. First, a focus offset is used to position the solid immersion lens 9b at a certain distance to the surface of the optical recording medium 10. For example, with a specified cover layer thickness of 3 µm the initial distance is about 0.5 µm to 1.5 µm. This distance ensures that for the complete allowed thickness range of the cover layer of 2.7 µm to 3.3 µm the distance between the solid immersion lens 9b and the surface of the optical recording medium 10 is always greater than 200 nm. Of course, these numbers have to be adjusted accordingly if the specified cover layer thickness is smaller or larger than 3 µm or if the allowed tolerances are different. The different optical paths and the different working distances between the solid immersion lens 9b and the surface of the optical recording medium 10 in far-field mode and in near-field mode are illustrated in FIG. 8 and FIG. 9, respectively. The figures are based on a solid immersion lens 9b with a numerical aperture NA=1.46 and a refractive index $n_{SIL}$=2.086 in combination with a cover layer with a thickness d=3 µm and a refractive index $n_{CL}$=1.6. In the figures, the optical recording medium 10 has a single data layer 102 sandwiched between a substrate 101 and the cover layer 103.

Further, the aberration compensation element 31 is used to compensate the defocus caused by spherical aberration in order to optimize the spot profile. This is possible because small spherical aberrations lead to a shift of the focus error signal curve (see, for example, T. H. Lan et al.: "*Servo Study of Radially Polarized Beam in High Numerical Aperture Optical Data Storage System*", Jpn. J. Appl. Phys. Vol. 46 (2007), pp. 3758-3760). By this method a focus shape can be defined which corresponds to NA<1. Although the spot diameter is larger compared to the near-field mode still five beams can be focused on the data layer 102 and astigmatic signals can be generated from all beams as defined above in formulae (1) to (5).

Figure 10:
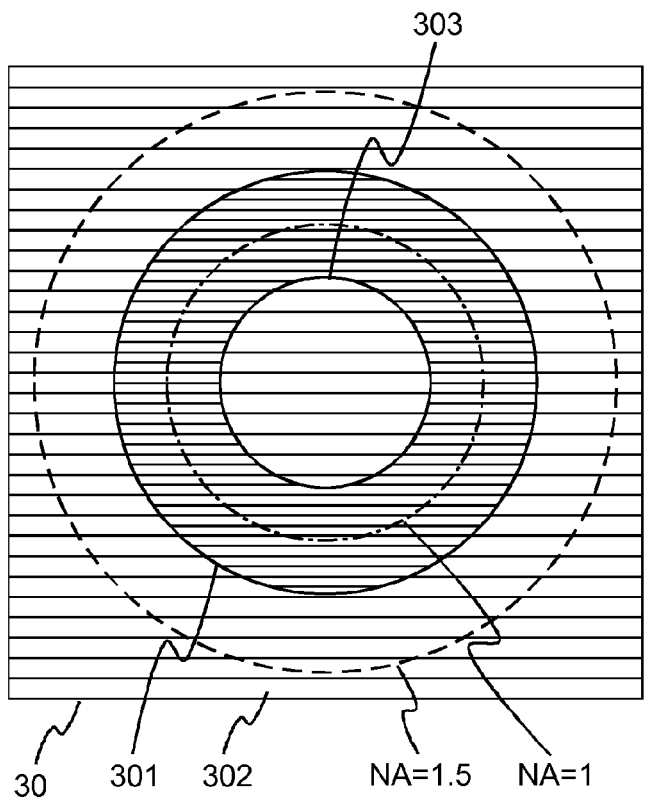
FIG. 10 depicts a top view of the diffractive optical element working in far-field mode.

In addition to the focus offset, the grating pattern of the diffractive optical element 30 is switched, e.g. by a liquid crystal element, in order to generate five beams with an inner part 303 corresponding to NA<1. As shown in FIG. 10 the inner part 303 of the grating is switched such that the grating period is equal to the period 2P in the outer area, whereas the grating period is P in the remaining ring area 301. Details of the switchable structure are explained below with reference to FIG. 12.

Figure 11:
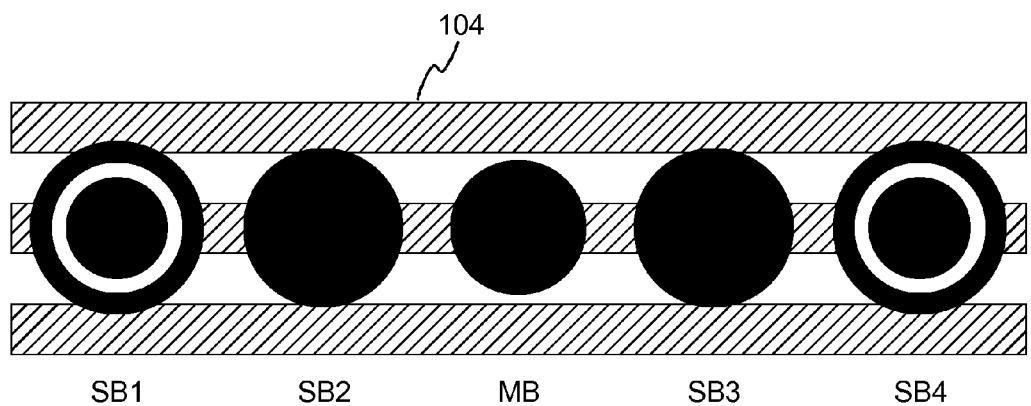
FIG. 11 depicts five light spots formed on the near-field optical recording medium in far-field mode.

As the outer area corresponding to NA>1 is not active in the far-field mode, the diffractive optical element 30 has a large grating period 2P in the inner area 303 and half of this grating period P in the remaining ring area 301. Consequently, five beams are generated, with an inverted shape and function of the first and fourth sub-beams SB1, SB4 and the second and third sub-beams SB2, SB3 compared to the near-field case. This is shown in FIG. 11. In accordance with the description given in R. Katayama et al.: "*Substrate thickness error and radial tilt detection using a five-beam optical head*", Appl. Opt. Vol. 48 (2009), pp. 2014-2026, a cover layer thickness error signal SE is then obtained as follows:

$$SE = (AS_{s2} + AS_{s3}) - (AS_{s1} + AS_{s4}) \quad (13)$$

This thickness error signal SE is used to adjust the aberration compensation element 31 once the apparatus 1 has switched into the near-field mode.

Figure 12:
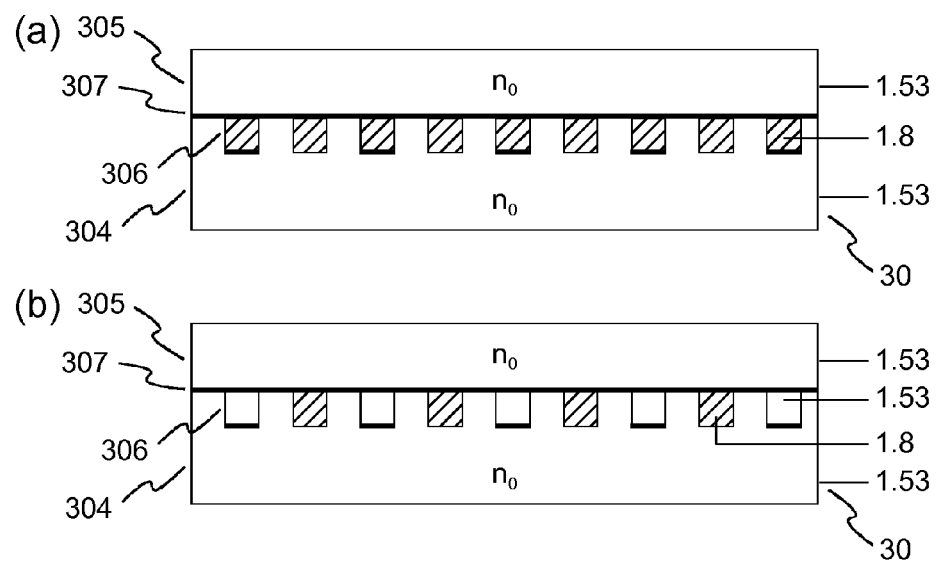
FIG. 12 illustrates the principle of a switchable grating in an inner part of the diffractive optical element.

The inner part 303 of the diffractive optical element 30 has to be switched between the status with a grating period 2P corresponding to the far-field mode shown in FIG. 10 and the status with a grating period of P corresponding to the near-field mode shown in FIG. 3. As shown in FIG. 12, the inner part 302 of the diffractive optical element 30 is filled with a liquid crystal 306, which is arranged in grooves sandwiched between two substrates 304, 305 with a diffractive index $n_0$. e.g. with $n_0$=1.53. The liquid crystal 306 can be switched for every second groove by applying a voltage between two transparent electrodes 307. Typically in the ground state (without applied voltage) the refractive index of the liquid crystal 306 is higher than for a higher voltage. FIG. 12(a) shows the diffractive optical element 30 at low voltage, FIG. 12(b) at high voltage.

Figure 13:
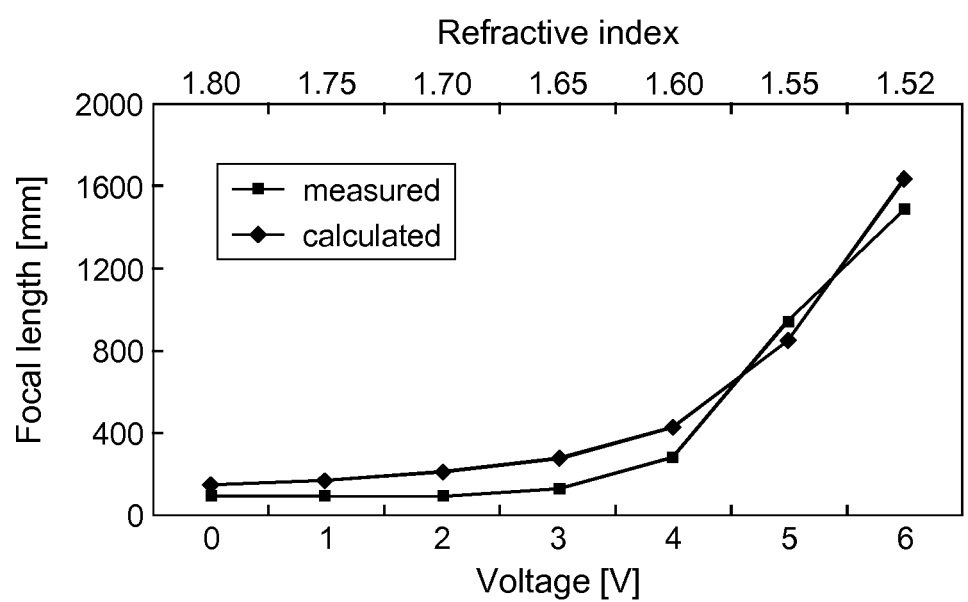
FIG. 13 shows a graph with measured and calculated focal length variation of a liquid crystal lens.

One example of a suitable liquid crystal is shown in FIG. 13, which is taken from S. H. Chung et al.: "*Liquid Crystal Lens for Compensation of Spherical Aberration in Multilayer Optical Data Storage*", Jpn. J. Appl. Phys. Vol. 45 (2006) pp. 1152-1157. The graph shows measured and calculated focal length variation of a liquid crystal lens at a wavelength of 405 nm. The squares designate the measured length, whereas the rhombi designate the calculated length. For a low voltage the refractive index is 1.81, while for a voltage of 6V the refractive index is reduced to 1.53. If this liquid crystal is used, the diffractive optical element 30 can be switched between two modes. In the near-field mode at a low voltage the refractive index is high. All groves are active for diffraction, which leads to a grating period P. In the far-field mode at a high voltage the refractive index is low for every second groove. Therefore, only every second groove is active for diffraction, which leads to a grating period 2P.

The invention claimed is:
1. An apparatus for reading from or writing to a near-field optical recording medium, with a light source for generating a reading light beam and with a near-field lens and an aberration compensation element, wherein the apparatus comprises
    a diffractive optical element that is switchable between a far-field mode and a near-field mode and generates a main light beam and four or more sub-beams from the reading light beam for determining at least a cover layer thickness error signal, wherein the diffractive optical element has an outer region with a first grating period and an inner region having a diameter smaller than an effective numerical aperture of the near-field lens, which in the near-field mode has a second grating period and which has a switchable inner area having a diameter smaller than a far-field numerical aperture of the near-field lens, which in the far-field mode has the first grating period, and wherein the aberration compensation element is adjusted based on the thickness error signal when the diffractive optical element is in the near-field mode.

2. The apparatus according to claim 1, wherein the switchable inner area comprises a liquid crystal grating structure sandwiched between transparent electrodes.

3. The apparatus according to claim 1, further comprising a first photodetector with five four-element detectors.

4. The apparatus according to claim 3, further comprising a second photodetector with at least three detectors.

5. The apparatus according to claim 1, wherein the apparatus determines at least one of a focusing error signal, a tracking error signal, a radial tilt error signal, a gap error signal, and a tangential tilt error signal in addition to the cover layer thickness error signal.

6. The apparatus according to claim 1, wherein the aberration compensation element compensates for coma or spherical aberrations.

7. A method for operating an apparatus for reading from or writing to a near-field optical recording medium, the method comprising the steps of:

operating a diffractive optical element of the apparatus in far-field mode by setting a grating pattern of an inner area of the diffractive optical element having a diameter smaller than a far-field numerical aperture of a near-field lens of the apparatus to a first grating pitch while setting a grating pattern of a ring area surrounding the inner area to a second grating pitch smaller than the first grating pitch;

operating the near-field lens in far-field mode by adding a focus offset to the near-field lens;

determining a cover layer thickness error signal from signals obtained from a main light beam and four or more sub-beams generated by the diffractive optical element;

switching the diffractive optical element into near-field mode by setting a grating pattern of an inner region of the diffractive optical element having a diameter smaller than an effective numerical aperture of the near-field lens to the second grating pitch while setting a grating pattern of an outer region surrounding the inner region to the first grating pitch;

switching the near-field lens into near-field mode; and using the thickness error signal to adjust an aberration compensation element once the diffractive optical element and the near-field lens have switched into the near-field mode.

8. The method according to claim 7, wherein switching the inner area of the diffractive optical element between the first grating pitch and the second grating pitch is performed by changing a voltage applied to a liquid crystal grating structure sandwiched between transparent electrodes.

9. The method according to claim 7, further comprising the step of scanning the cover layer thickness between a start data zone and a target data zone during a jump over the surface of the near-field optical recording medium.

10. The method according to claim 7, further comprising the step of confirming the cover layer thickness in a target data zone before switching into the near-field mode.

11. The method according to claim 7, wherein the aberration compensation element compensates for coma or spherical aberrations in response to the thickness error signal.

* * * * *